United States Patent [19]

Crass et al.

[11] Patent Number: 4,734,318

[45] Date of Patent: Mar. 29, 1988

[54] MULTILAYER PACKAGING FILM HAVING SUPERIOR SCRATCH RESISTANCE

[75] Inventors: Guenther Crass, Taunusstein; Rudolf Mauer, Mainz-Weisenau; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 927,163

[22] Filed: Nov. 5, 1986

[30] Foreign Application Priority Data

Nov. 13, 1985 [DE] Fed. Rep. of Germany ....... 3540215

[51] Int. Cl.$^4$ .................... B32B 27/08; B32B 27/32
[52] U.S. Cl. .................................. 428/216; 428/349; 428/447; 428/516
[58] Field of Search ................ 428/216, 349, 516, 447

[56] References Cited

U.S. PATENT DOCUMENTS

| | | | |
|---|---|---|---|
| 4,293,608 | 10/1981 | Isaka et al. | 428/220 |
| 4,294,882 | 10/1981 | Andrews et al. | 428/349 |
| 4,348,457 | 9/1982 | Rosenthal et al. | 428/349 |
| 4,502,263 | 3/1985 | Crass et al. | 53/396 |
| 4,595,625 | 6/1986 | Crass et al. | 428/349 |

FOREIGN PATENT DOCUMENTS 3331983 3/1985 Fed. Rep. of Germany .
1145199 3/1969 United Kingdom .

*Primary Examiner*—Edith Buffalow
*Attorney, Agent, or Firm*—Schwartz, Jeffery, Schwaab, Mack, Blumenthal & Evans

[57] ABSTRACT

A sealable, transparent multilayer film comprised of a base layer, essentially of polypropylene, which is coated on both sides with further polyolefin layer is described. The base layer is coated on both surfaces with a layer of polypropylene which contains, as additives (i) 0.1 to 1% by weight of an inorganic pigment and
(ii) 0.2 to 1% by weight of an oxyalkylamine, in each case relative to the total weight of the layer. Both free surfaces of the polypropylene layers are coated with a sealable covering layer which comprises a combination of (a) 68.5 to 89.7% by weight of an olefin resin composition comprising a copolymer or terpolymer of ethylene, propylene, butylene or further α-olefins having 5 to 10 carbon atoms or mixtures of these,
(b) 5 to 15% by weight of a low molecular weight resin compatible with the olefin resin composition,
(c) 5 to 15% by weight of a propylene homopolymer and
(d) 0.3 to 1.5% by weight of polydiorganosiloxane, in each case relative to the total weight of the sealable covering layers.

21 Claims, No Drawings

MULTILAYER PACKAGING FILM HAVING SUPERIOR SCRATCH RESISTANCE

BACKGROUND OF THE INVENTION

The present invention relates to a sealable, transparent multilayer film comprising a base layer, essentially of polypropylene, which is coated on both sides with further polyolefin layers.

German Offenlegungsschrift No. 1,694,694 discloses heat-sealable laminates which consist of an oriented polypropylene film which possesses at least one heat-sealable layer made of an ethylene-propylene copolymer of 2 to 6% by weight of ethylene and 98 to 94% by weight of propylene. Though these films possess good heat-sealability, they are not as clear and scratch resistant as desired, and furthermore they have unsatisfactory processing characteristics on high-speed packaging machinery.

European Pat. No. 27,586 discloses sealable polypropylene films which have a sealing layer of an ethylene homopolymer or copolymer, provided with a long-chain aliphatic amine, an incompatible thermoplastic component and a polydialkylsiloxane. It is true that these films constitute an improvement compared to German Offenlegungsschrift No. 1,694,694, but they still have insufficiently reliable running characteristics on horizontal form-fill-seal machines.

German Offenlegungsschrift No. 2,941,140 discloses a packaging material which consists of a base layer of a propylene polymer and a surface layer of a blend of a propylene-ethylene copolymer and a ($C_4$–$C_{10}$) -$\alpha$-olefin-propylene copolymer. This surface layer can also contain a low molecular weight thermoplastic resin as well as silicone oils. Such packaging materials have the disadvantage that they are prone to scratching and still have unsatisfactory optical properties.

German Offenlegungsschrift No. 3,247,998 discloses a film which has sealing layers of a polyolefin copolymer or terpolymer of a particular composition and which, as a result of modification with a propylene homopolymer, a dimethylpolysiloxane and a synthetic resin, has not only good processing characteristics on high speed packaging machinery but also improved optical appearance. Although this film does meet the requirements made of a packaging film from the point of view of machine running, the handling of the film presents considerable problems due to the extremely smooth surfaces, which have very low coefficients of friction. Thus, on slitting these films down from the original roll width (4–6 m) to smaller widths, there is increased sideways drift, i.e., due to the sideways movement of the film at high speeds, and the desired width is not achieved exactly but exceeded to a greater or lesser degree. The term "making-up" will be used in the text which follows to include the slitting and winding-up process.

A further disadvantage of the film described above is its high tendency to telescope on the roll during handling, either on the slitting machine or on insertion into the packaging machine. The term "telescoping" denotes a sideways shift of the film on the roll, in which surfaces resting on one another slide to one side, having the effect that the edges of the film are no longer exactly superposed but are each staggered by a small amount in one direction so that the entire roll protrudes, on one side, to a greater or lesser extent beyond the winder core. Telescoping normally occurs if the rolls are knocked or kept slightly inclined.

Due to these difficulties, the machine speed during making-up must be reduced to about half its normal value and the subsequent handling of the rolls must be carried out with extreme care.

German Offenlegungsschrift No. 3,331,983 describes a sealable polyolefin multilayer film having good processing characteristics on high speed packaging machinery and at the the same time exhibiting good making-up characteristics and no tendency to telescope. However, the scratch resistance of this film still requires improvement.

SUMMARY OF THE INVENTION

It is therefore an object of the present invention to provide a sealable transparent polyolefin multilayer film which has good processing characteristics on high speed packaging machinery, and at the same time exhibits its good making-up characteristics and no tendency to telescope, and furthermore also has superior scratch resistance.

In accomplishing the foregoing objects, there has been provided according to the present invention a sealable, transparent, multilayer plastic film comprising a base layer comprising a propylene polymer; on both sides of the base layer an intermediate layer comprising: a propylene polymer, an inorganic pigment in an amount from about 0.1 to 1.0% by weight, and an oxyalkylamine in an amount from about 0.2 to 1.0% by weight, calculated on total weight of said two intermediate layers; and on both of the intermediate layers, a top layer comprising a sealable thermoplastic material based on propylene polymer. Preferably, the sealable thermoplastic material of the two top layers comprises (a) a first olefin resin comprising a copolymer or terpolymer of ethylene, propylene, butylene or further alpha-olefins having 5 to 10 carbon atoms, or mixtures of these in an amount from about 68.5 to about 89.7% by weight, (b) a second resin being compatible with the first olefin resin, having a softening point lying within the range from about 60 to about 180° C., determined according DIN 1995-U4, in an amount from about 5 to about 15% by weight, (c) a propylene homopolymer in an amount from about 5 to about 15% by weight, and (d) a polydiorganosiloxane in an amount from about 0.3 to about 1.5% by weight, calculated in each case on total weight of the two top layers.

Further objects, features and advantages of the present invention will become apparent from the detailed description of preferred embodiments which follows.

DETAILED DESCRIPTION OF THE PREFERRED EMBODIMENTS

The invention provides a sealable, transparent multilayer plastic film having the characterizing features that the base layer is coated on both surfaces with intermediate layers of propylene polymer which comprises, as additives:
(i) 0.1 to 1% by weight of an inorganic pigment and
(ii) 0.2 to 1% by weight of an oxyalkylamine,
in each case calculated on the total weight of the intermediate layers, and that both free surfaces of the intermediate layers are coated with sealable top layers which comprise a combination of:
(a) about 68.5 to 89.7% by weight of an olefin resin composition comprising a copolymer or terpolymer of ethylene, propylene, butylene or further α-olefins having 5 to 10 carbon atoms or mixtures of these,
(b) about 5 to 15% by weight of a low molecular weight resin compatible with the olefin resin composition,
(c) about 5 to 15% by weight of a propylene homopolymer, and
(d) about 0.3 to 1.5% by weight of a polydiorganosiloxane, in each case calculated on total weight of said top layers.

The base layer of the sealable multilayer film comprises a propylene homopolymer or of a polymer which consists predominantly of propylene and has a melting point of about 140° C. or above, preferably of about 150° C. or above.

Isotactic polypropylene having an n-heptane-soluble content of about 15% by weight or less, copolymers of ethylene and propylene having an ethylene content of about 10% by weight or less, and copolymers of polypropylene with ($C_4$–$C_8$)-α-olefins having a ($C_4$–$C_8$)-α-olefin content of about 10% by weight or less represent specific examples of the propylene polymer of the base layer.

The propylene polymer of the base layer advantageously has a melt flow index of about 0.5g/10 min to 8 g/10 min at 230° C. under 2.16 kp load (DIN 53,735), especially of about 1.5 g/10 min to 4 g/10 min.

The base layer of propylene polymer preferably contains no additives other than any requisite stabilizer.

Preferably, the intermediate layers which are applied as a coating to both surfaces of the base layer employ the same propylene polymer as the base layer, though the propylene polymer of the intermediate layers comprises, as additives, both an inorganic pigment and an oxyalkylamine, in the amounts already stated.

As inorganic pigments there may in particular be used silicon dioxide, calcium carbonate and aluminum silicate, the last-mentioned being preferred. The inorganic pigment should be present in the form of uniformly distributed small particles, the mean particle diameters being about 0.1 to 3.0 μm, preferably about 0.2 to 1.5 μm.

As oxyalkylamine additives there may be in particular be employed long-chain aliphatic tertiary amines, which are optionally mono-unsaturated, preferably tertiary amines in which the longest chain has a carbon number of from 12 to 18. N,N-Bis-ethoxyalkylamines, such as ARMOSTAT 300, are especially preferred.

The first, olefin resin compositions employed according to the invention for the top layers may be comprised of copolymers or terpolymers of ethylene, propylene, butylene or further α-olefins with up to 10 carbon atoms or of the blends of these. The composition is of the type usually employed for sealing layers. Generally, a copolymer of ethylene and propylene containing between about 3 and 10% by weight of ethylene is used for this purpose, but copolymers of ethylene and butylene or blends of ethylene-butylene copolymers with ethylene-propylene-butylene terpolymers may equally be used. The melting point of such resins is about 130° C. or above and the melt flow index is in the range from about 0.1 to 16 g/10 min at 230° C. and 2.16 kp load (DIN 53,735).

The second, low molecular weight resin, compatible with the first, olefin resin composition, which is employed according to the invention is a natural or synthetic resin. The resin has a softening point of from about 60° to 180° C. (determined according to DIN 1995-U4) preferably of about 80° to 130° C.

By compatible resins there are to be understood resins which, when admixed with the olefin resin composition of the sealing layer in a concentration of up to about 15% by weight cause no increased clouding of the film.

The natural or synthetic resins added to modify the polyolefin are the known so-called hard resins. These include, for example, hydrocarbon resins such as coumarone resins, petroleum resins and terpene resins, ketone resins, polyamide resins, aldehyde resins such as xylene-formaldehyde resins and naphthalene-formaldehyde resins, dammar resins and rosin. These resins are described, e.g., in Ullman, *Encyklopaedie der technischen Chemie*, Vol. 12, 1976, pp. 525–555.

Coumarone resins are mostly obtained by polymerizing dephenolated and base-freed fractions of coal tar light oil, which for example contain indene, styrene, dicyclopentadiene, coumarone and homologs thereof as unsaturated compounds. Diverse modification is possible by copolymerization, for example, with phenol.

The raw material base of the petroleum resins is obtained when cracking naphtha or gas oil to give raw materials for the chemical industry, such as ethylene and propylene. The raw material base may for example contain resin-forming compounds such as butene, butadiene, pentene, piperylene, isoprene, cyclopentadiene, dicyclopentadiene, alkylbenzenes, methyldicyclopentadiene, methylindene, naphthalene, styrene, indene, vinyltoluene and methylstyrene.

Terpene resins are polymers of terpenes. Beta-pinene, dipentene, limonene, myrcene, bronylene, camphene and similar terpenes may be mentioned as examples of suitable terpenes.

The hydrocarbon resins may be modified by, for example, reaction of the raw materials before polymerization, introduction of special monomers or reaction of the polymerized product. A preferred type of modification is hydrogenation or partial hydrogenation of unsaturated constituents of the resins.

Dammar resins are obtained by tapping of resin from trees of the family of the Dipterocarpaicae.

Rosin is a natural resin which is obtained from the crude balsam of conifers (balsam resin), the extract of conifer stubs (root resin) or from tall oil (tall resin) and which essentially consists of abietic acid and its isomers. Modified rosin may also be used, this being formed by polymerization, hydrogenation, dehydrogenation, oxidation, decarboxylation, saponification, esterification, isomerization or disproportionation of rosin.

Preferred resins are styrene polymers, alpha-methylstyrene/styrene copolymers, alpha-methylstyrene/vinyltoluene copolymers, hydrogenated alpha-methylstyrene/vinyltoluene/indene copolymers, pentadiene polymers, hydrogenated cyclopentadiene polymers, alpha-pinene or beta-pinene polymers, terpene polymers, rosin and modified rosin.

The lower limit of about 5% by weight, relative to the total weight of the sealable top layers, of the low molecular weight resin compatible with the first, olefin resin composition should not be breached, since only at relatively high contents does the effect of the resin additive on the optical properties and the scratch sensitivity manifest itself.

Using more than about 15% by weight, relative to the total weight of the sealable top layers, of low molecular weight resin compatible with the olefin resin composition has proved inadvisable, for processing reasons.

The propylene homopolymer employed as component (c) of the sealable covering layers should have a melt temperature above the melt temperature of component (a). Additions of less than about 5% by weight of propylene homopolymers result in only slight improvements in optical properties and scratch resistance, and as yet inadequate improvements in machine running on high speed packaging machinery. Additions of more than about 15% by weight would admittedly further improve the optical properties, scratch resistance and machine running, but produce a marked deterioration in the sealing properties.

According to the invention, it is possible to employ polydiorganosiloxanes or mixtures of these, which have a viscosity of at least about 100 mm$_2$/sec at 25° C. Examples of suitable polydiorganosiloxanes which may be highlighted are polydialkylsiloxanes, polyalkylphenylsiloxanes, olefin-modified siloxane oils, polyether-modified silicone oils, olefin/polyether-modified silicone oils, epoxy-modified silicone oils and alcohol-modified silicone oils, and polydialkylsiloxanes with, preferably, 1 to 4 carbon atoms in the alkyl group, especially polydimethylsiloxanes.

The amount of polydiorganosiloxane used as component (d) should not be less than about 0.3% by weight, relative to the weight of the sealable top layer, since, with the raw material combination described, such lower amounts still lead to increased waste on high-speed packaging machinery; on the other hand, higher amounts than about 1.5% by weight, relative to the weight of the sealable top layer, of polydiorganosiloxane lead to processing difficulties in film manufacture and to faulty wrapping on packaging machinery due to insufficient friction.

The five-layer packaging film described in full detail above is produced by the coextrusion process, in which the polymers or compositions which form the individual layers of the film are melted in separate extruders and the melts are then extruded, either from a multilayer die or using the adapter method, to give a raw film, which is chilled. In order to give it the desired strength and dimensional stability, the raw film is then biaxially stretch-oriented and heat-set. Films produced in this manner have a total thickness in the range from about 10 to 50 μm, preferably from about 15 to 35 μm. According to the invention, the sealable covering top layers should each have thicknesses of at most up to about 3 μm and preferably have thicknesses in the range from about 0.2 to 1 μm.

The layers of polypropylene with additives, which are the intermediate layers and in direct contact with the base layer, should also each have, according to the invention, thicknesses of at most up to about 3 μm and preferably have thicknesses in the range from about 0.5 to 1.5 μm.

The invention will be further explained below by way of an example, in comparison with the state of the art.

EXAMPLE 1

A 1 mm thick multilayer film, of which the base consisted of polypropylene having a melt flow index of 2 g/10 min, covered on both sides with two different outer layers, was produced by the coextrusion process, using a slot die of 280 mm width and 1.8 mm gap, at an extrusion temperature 260° C. and a feed rate of 70 kg/h. These films travelled through a 20 mm long air gap and were then chilled on a cooling drum, of 600 mm diameter, which was at 30° C. and ran at a circumferential speed of 4.5 m/min. Thereafter the films were transferred from the cooling drum onto a three-roll stack, again at 30° C. and again running at a circumferential speed of 4.5 m/min, and were subsequently stretched lengthwise, after having been heated to 130° C., by a factor of 5 on a further three-roll stack. The films were subsequently stretched 10-fold in the transverse direction at 175° C. air temperature.

The multilayer film thus formed had a base layer of polypropylene, of about 17 μm thickness. The intermediate layers containing the additives were present on both sides of the base layer and each had a thickness of 1 μm. The layers consisted of:
99.1% by weight of propylene homopolymer,
0.4% by weight of aluminum silicate, and
0.5% by weight of N,N-bisethoxyalkylamine (ARMOSTAT 300).

The layers containing the additives each carried the sealable covering top layers which each had thicknesses of 0.5 to 0.8 μm. The sealable covering top layers consisted of:
79.3% by weight of a copolymer of ethylene and propylene, having an ethylene content of 4.5% by weight, relative to the weight of the copolymer,
10.0% by weight of propylene homopolymer,
0.7% by weight of polydimethylsiloxane, and
10.0% by weight of ARKON P125, a hydrogenated hydrocarbon resin having a softening point of 125° C.

Various measurements were carried out on this film, the results of which are summarized in the table at the end of the description.

The individual measurements were carried out according to the following methods:

Melt flow index—DIN 53,735 at 230° C. and 2.16 kp load

Softening point—DIN 1995-U4

Melting point—DSC measurement, maximum in the fusion curve, heating rate 20° C./min.

Clouding:

The clouding of the film is measured by a method based on ASTM-D 1003-52, using a 1° slit diaphragm instead of a 4° hole diaphragm and recording the clouding in percent for four superposed film layers. The four layers were chosen since this makes use of the optimum measuring range.

Gloss:

The gloss is measured on a reflectometer, type RGN 10.01.02 according to Dr. Schwarzau, Berlin, with a plane, polished black glass plate as the standard.

Scratch Resistance or Scratch Sensitivity:

The scratch resistance is determined by a method based on DIN 53,754.

To determine the scratch resistance, the Taber model 503 Abraser from Teledyne Taber is used, employing abrasion wheels of type Calibrade ® H18 under a load of 250 g. The scratch resistance or scratch sensitivity is the increase in clouding of the scratched film compared to the original film after 50 revolutions of the test plate.

The antistatic properties of the films were assessed by means of the ash test. The film is charged up by rubbing it three times with a woollen cloth in one direction. The antistatic properties are good if the rubbed film surface does not attract cigarette ash from a distance of 3 cm, and inadequate if the ash is attracted.

EXAMPLE 2

(Comparative Example)

For comparison, a film according to the nearest state of the art (German Offenlegungsschrift No. 3,331,983) was produced by the same process as in Example 1.

The comparison film had a three-layer structure with a base layer, about 19 μm thick, of polypropylene and, on both surfaces of the base layer, sealable covering layers with thicknesses of about 0.5 to 0.8 μm.

The sealing layers consisted of:

(a) 79.3% by weight of a random copolymer of ethylene and propylene, having an ethylene content of 4.5% by weight, relative to the amount of the copolymer,
(b) 10% by weight of a propylene polymer having a melting point of 162° C.,
(c) 0.7% by weight of polydimethylsiloxane having a kinematic viscosity of 30,000 mm$^2$/s at 25° C.,
(d) 10% by weight of ARKON P125, a hydrogenated hydrocarbon resin having a softening point of 125° C., and
(e) 0.5% by weight of flaky or platelet-shaped aluminum silicate having a mean particle diameter of 0.5 to 0.6 μm.

The superiority of the film according to the invention, in accordance with Example 1 emerges clearly from the table.

TABLE

| Example | Gloss (%) S1 + S2 / 2 | Clouding (%) four Layers | SS (%) S1 + S2 / 2 | Antistatic properties | MP | MMU |
|---|---|---|---|---|---|---|
| Example 1 | 120 | 18 | 12 | + | + + | + + |
| Example 2, comparative example | 105 | 21 | 21 | – – | + + | + + |

S = side
SS = scratch sensitivity
MP = machine running on packaging machine
MMU = machine running during making-up
+ + = very good
+ = good
– – = inadequate

What is claimed is:

1. Sealable, transparent, multilayer plastic film comprising:
   a base layer comprising a propylene polymer;
   on both sides of said base layer an intermediate layer comprising:
   a propylene polymer,
   an inorganic pigment in an amount from about 0.1 to 1.0% by weight, and
   an oxyalkylamine in an amount from about 0.2 to 1.0% by weight, calculated on total weight of said two intermediate layers; and
   on both of said intermediate layers, a top layer comprising a sealable thermoplastic material based on propylene polymer.

2. A film as claimed in claim 1, said sealable thermoplastic material of said two top layers comprising:
   (a) a first olefin resin comprising a copolymer or terpolymer of ethylene, propylene, butylene or further alpha-olefins having 5 to 10 carbon atoms, or mixtures of these in an amount from about 68.5 to about 89.7% by weight,
   (b) a second resin being compatible with said first olefin resin, having a softening point lying within the range from about 60° to about 180° C., determined according DIN 1995-U4, in an amount from about 5 to about 15% by weight,
   (c) a propylene homopolymer in an amount from about 5 to about 15% by weight, and
   (d) a polydiorganosiloxane in an amount from about 0.3 to about 1.5% by weight, calculated in each case on total weight of said two top layers.

3. A film as claimed in claim 2, wherein said second resin comprises a hydrocarbon resin or rosin or a mixture thereof.

4. A film as claimed in claim 2, wherein said second resin has a softening point lying within the range of from about 80 to about 130° C.

5. A film as claimed in claim 2, wherein said polydiorganosiloxane has a kinematic viscosity of at least about 100 mm$^2$/s at 25° C.

6. A film as claimed in claim 1, wherein said inorganic pigment of said two intermediate layers has a mean particle diameter lying within the range from about 0.1 to about 3.0 μm.

7. A film as claimed in claim 6, wherein said mean particle diameter is within the range from about 0.2 to 1.5 μm.

8. A film as claimed in claim 6, wherein said inorganic pigment comprises silicon dioxide, calcium carbonate, aluminum silicate or a mixture thereof.

9. A film as claimed in claim 1, wherein said oxyalkylamine of said two intermediate layers comprises long-chain aliphatic tertiary amines, the longest chain having a number of carbon atoms of from about 12 to 18.

10. A film as claimed in claim 9, wherein said oxyalkylamine comprises a mono-unsaturated tertiary amine.

11. A film as claimed in claim 9, wherein said oxylakylamine comprises an N,N-Bis-ethoxyalkylamine.

12. A film as claimed in claim 2, wherein said first olefin resin comprises:
   a copolymer of ethylene and propylene having an ethylene content within the range from about 3 to about 10% by weight, calculated on total weight of said copolymer;
   a copolymer of ethylene and butylene;
   a terpolymer of ethylene, propylene and butylene; or
   a mixture thereof.

13. A film as claimed in claim 3, wherein said second resin comprises a coumarone resin, a petroleum resin, a terpene resin, a ketone resin, a polyamide resin, an aldehyde resin, a dammar resin, rosin or a mixture thereof.

14. A film as claimed in claim 5, wherein said polydiorganosiloxane comprises a polydialkylsiloxane having from 1 to 4 carbon atoms in the alkyl group, a polyalkylphenylsiloxane, olefin-modified siloxane oil, a polyether-modified siloxane oil, an epoxy-modified siloxane oil, an alcohol-modified siloxane oil or a mixture thereof.

15. A film as claimed in claim 14, wherein said polydialkylsiloxane consists essentially of polydimethylsiloxane.

16. A film as claimed in claim 1, having a total thickness from about 10 to about 50 μm.

17. A film as claimed in claim 16, having a total thickness from about 15 to about 35 μm.

18. A film as claimed in claim 1, wherein the maximum thickness of each of said two top layers is about 3 μm.

19. A film as claimed in claim 18, wherein each of said two top layers has a thickness from about 0.2 to about 1.0 μm.

20. A film as claimed in claim 1, wherein the maximum thickness of each of said two intermediate layers is about 3 μm.

21. A film as claimed in claim 20, wherein each of said two intermediate layers has a thickness from about 0.5 to about 1.5 μm.

* * * * *